United States Patent [19]

Honda et al.

[11] Patent Number: 4,764,158
[45] Date of Patent: Aug. 16, 1988

[54] POWER TRANSMISSION CHAIN

[75] Inventors: Shoichi Honda, Tokyo; Masahiro Nagae; Hiroshi Fukumoto, both of Kaga, all of Japan

[73] Assignees: Honda Giken Kogyo Kabushiki Kaisha, Tokyo; Daido Kogyo Co., Ltd., Kaga, both of Japan

[21] Appl. No.: 932,319

[22] Filed: Nov. 19, 1986

[30] Foreign Application Priority Data

Nov. 27, 1985 [JP] Japan .................................. 60-266809
Dec. 25, 1985 [JP] Japan .................................. 60-290693

[51] Int. Cl.$^4$ ............................................. F16G 13/04
[52] U.S. Cl. ...................................... 474/212; 474/215
[58] Field of Search .............................. 474/212–217; 59/78.1

[56] References Cited

U.S. PATENT DOCUMENTS 3,213,699 10/1965 Terepin .................................. 474/215
3,353,421 11/1967 Ketterle et al. ....................... 474/215
4,345,904 8/1982 Numazawa et al. .................. 474/215

Primary Examiner—Thuy M. Bui
Attorney, Agent, or Firm—Oblon, Fisher, Spivak, McClelland & Maier

[57] ABSTRACT

A chain constituted by an endlessly connected link plate groups each consisting of a plural number of link plates with paired pin-receiving holes and successively connected with adjacent link plate groups with the respective link plates intermeshed with the link plates of adjacent groups and with a shift of one pitch from the latter, by means of paired rocker pins inserted in the pin-receiving holes of the intermeshed link plates in back-to-back relation with each other, the rocker pins being formed in an arcuate shape and spaced from each other by a predetermined gap space when the centers of the pin-receiving holes of the intermeshed link plates are brought into alignment with each other. The chain may be assembled in such a manner as to maintain the gap space when the chain is lapped around a rotational drive member and a driven member, or in such a manner that the pin-receiving holes of the preceding and succeeding link plate groups are offset in the direction of the pitch line when the chain is fitted in position.

12 Claims, 10 Drawing Sheets

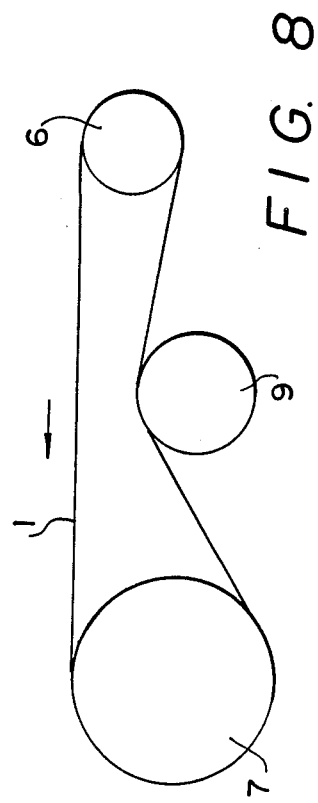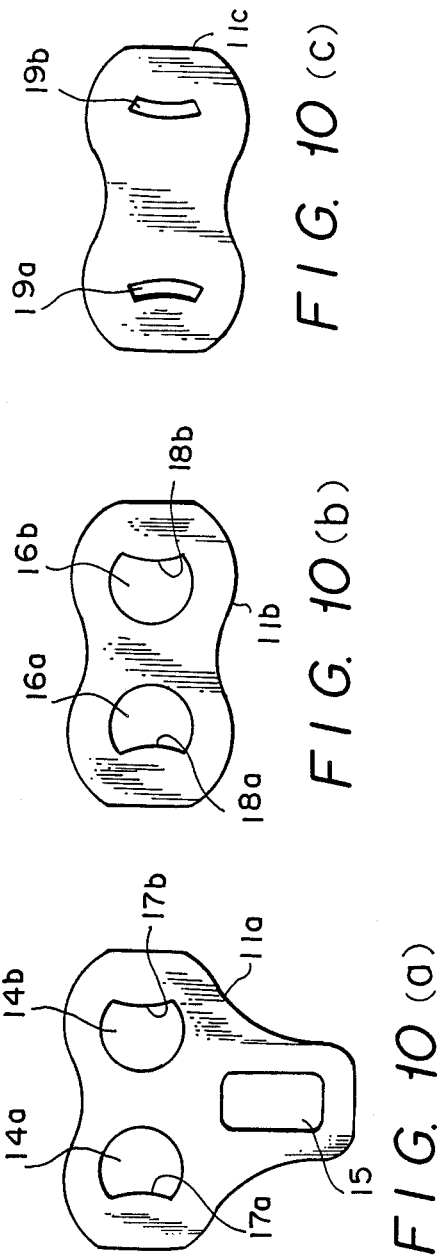

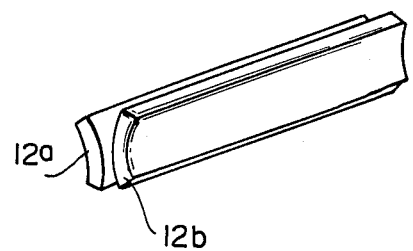
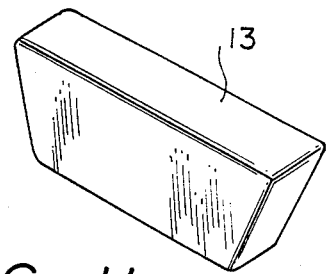
FIG. 11(a)  FIG. 11(b)
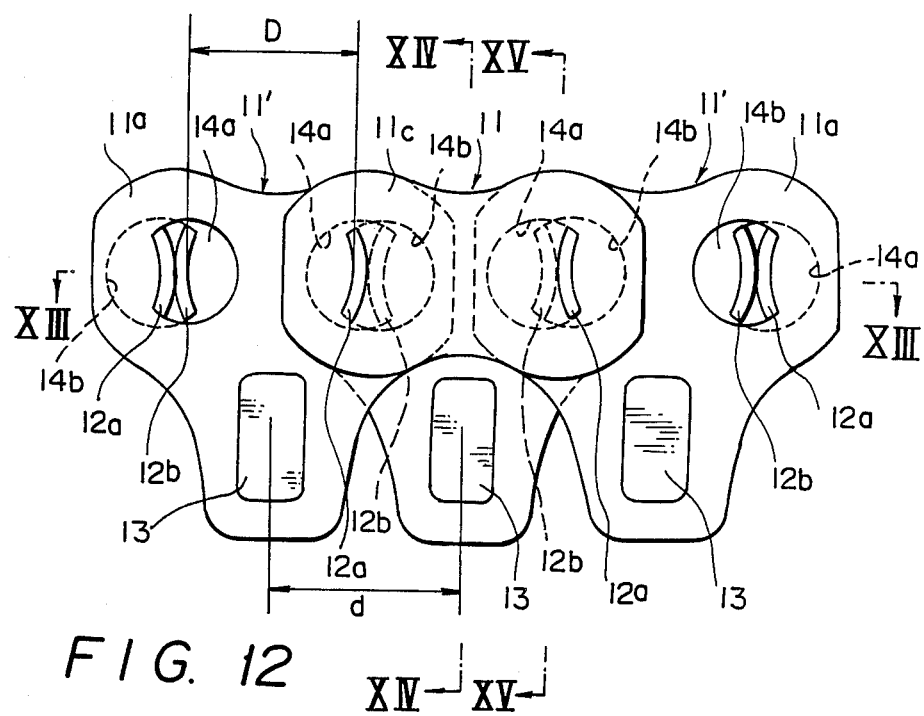
FIG. 12

POWER TRANSMISSION CHAIN

BACKGROUND OF THE INVENTION

1. Field of the Invention

This invention relates to an endless chain to be lapped around a rotational drive member and a driven member for power transmission as by a silent chain, chain belt or the like.

2. Prior Art

The chains for silent chains or chain belts are generally constituted by endlessly connected link plate groups which consist of a plural number of link plates each with a pair of pin-receiving holes, and successively connected with a shift of one pitch from adjacent groups and with the respective link plates intermeshed alternately with the link plates of the latter, by means of paired rocker pins of sectionally arcuate shape inserted in the pin-receiving holes of the intermeshed link plates in back-to-back relation with each other. The chain is lapped around a rotational driving member such as a sprocket or pulley and a driven member to transmit power from the driving to driven member.

Since the chain is lapped around a rotational member as mentioned above, the adjacent link plate groups which are connected by the rocker pins should be flexible relative to each other in order to ensure smooth lapping of the chain. For this purpose, the paired rocker pins are inserted in the pin-receiving holes in contact with each other in back-to-back relation to permit rolling movements of the respective pins, namely, to permit flexion between the adjacent link plate groups. The range of the flexing movements of the link plate groups varies depending upon the radius of curvature of large arc portions which form the back sides of the respective rocker pins. The range of the relative rolling movements is broadened by minimizing the radius of curvature of the large arc portions, permitting flexing movements of a broader range between the adjacent link plates groups.

In this connection, it is advantageous from the standpoint of power transmission efficiency to enlarge the radius of curvature of the arcs of the rocker pins. Besides, a larger radius of curvature is advantageous in that the Hertz stress can be suppressed, permitting one to reduce the frictional wear in contacting portions of rocker pins for protection thereof.

Therefore, it has been the usual practice in the prior art to limit the afore-mentioned flexing movements of rocker pins to a range which is necessary for smoothly lapping the chain on rotational members, for the purpose of enhancing the efficiency of power transmission.

However, in case the relative flexing movements of the link plate groups is suppressed to a minimum necessary range for lapping the chain around the drive and driven members, the respective link plate groups of a chain become unable to flex in the reverse direction or their inverse flexing movements are restricted to a considerable degree. If such a chain is used under a condition involving large torque fluctuations, vibrations or noises are generated by unduly large forces which are imposed on the chain due to limitation of the inverse flexing movements between the respective link plate groups. There arises another problem that extremely high stress is generated between link plates and rocker pins which are held in lock-up state, accelerating their fatigue and inducing ruptures at an early stage. Further, a chain to be rotated at high speed is usually provided with a tensioner therealong. However, it becomes necessary to use a tensioner of a small radius of curvature in a case where the inverse flexing movements are limited as mentioned hereinbefore, resulting in a failure of taking up slack of the chain by the tensioner or extremely large restrictions in its layout.

SUMMARY OF THE INVENTION

With the foregoing situations in view, the present invention has as its object the provision of a chain for power transmission, which permits flexing movements of a broader range between adjacent link plate groups without impairing the efficiency of power transmission.

It is another object of the invention to provide a chain for power transmission, which permits inverse flexing movements of endlessly connected link plate groups to ensure smooth operation and prolonged service life.

In order to achieve the above-mentioned objects, the present invention provides a chain to be lapped around a rotational drive member and a driven member for power transmission therebetween, the chain being constituted by endlessly connected link plate groups each consisting of a plural number of link plates each having a pair of pin-receiving holes and intermeshed alternately with link plates of adjacent groups with a shift of one pitch from the latter, and a pair of rocker pins inserted in back-to-back positions in the pin holes of the link plate groups, characterized in that the pin-receiving holes of intermeshed adjacent link plates groups are formed to leave a gap space of a predetermined width between the paired rocker pins when the centers of the respective pin-receiving holes are aligned with each other.

The above and other objects, features and advantages of the invention will become more apparent from the following description, taken in conjunction with the accompanying drawings which show by way of example preferred embodiments of the invention.

BRIEF DESCRIPTION OF THE DRAWINGS

In the accompanying drawings:

FIG. 8 is a schematic illustration showing the general arrangement of a silient chain combined with an additional rotary component;

FIGS. 10(a) to 10(c) are schematic outer views of a mian link plate, a sublink plate and a pin link plate, respectively;

FIGS. 11(a) and 11(b) are schematic perspective views of rocker pins and a V-block, respectively;

FIG. 12 is an enlarged outer view of the major components of the chain belt of FIG. 9;

DESCRIPTION OF PREFERRED EMBODIMENTS

Referring to FIGS. 1 through 6, there is shown a first embodiment of the invention, employing the power transmission chain of the invention as a silent chain.

Figure 1:
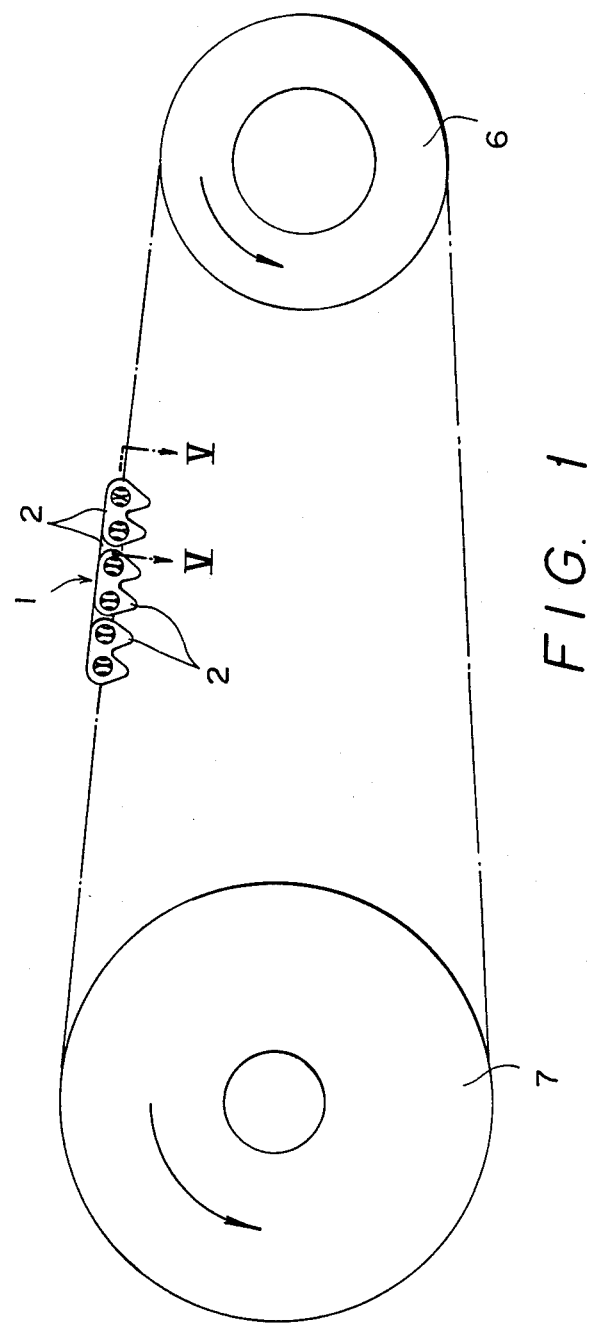
FIG. 1 is a schematic illustration showing the general construction of the power transmitting chain according to the present invention, which is applied as a silient chain.
Figure 2:
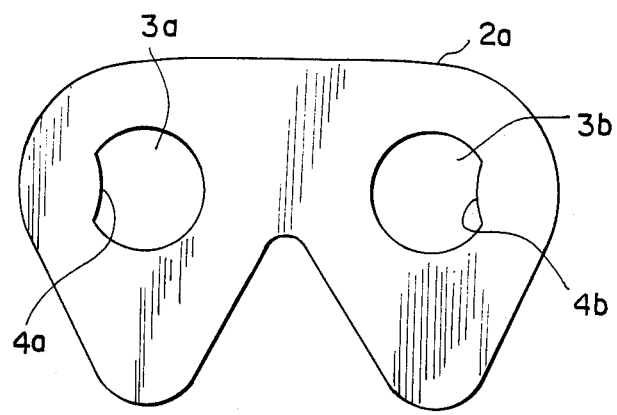
FIG. 2 is a schematic outer view of a link plate.
Figure 3:
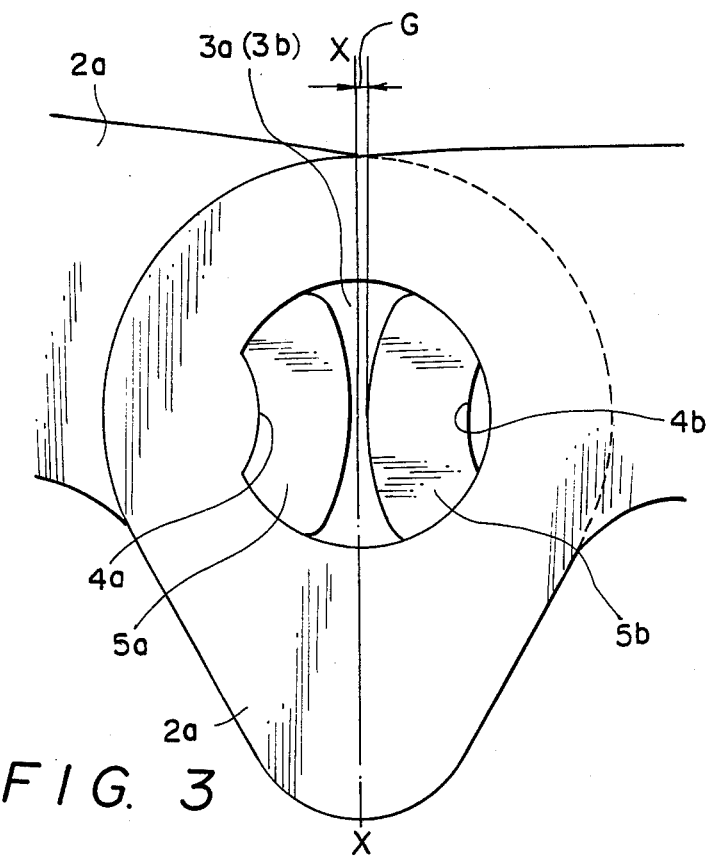
FIG. 3 is an enlarged outer view of a link plate and rocker pins shown in FIG. 1.

In FIG. 1, the reference numeral 1 denotes a chain which is constituted by an endlessly connected link plate groups 2 which each consist of a plural number of laterally spaced, gourd-shaped link plates 2a with a pair of tooth portions in front and rear portions as shown in FIG. 2, and connected to adjacent link plate groups in an intermeshing fashion. Each link plate 2a is provided with a pair of pin-receiving holes 3a and 3b at a distance of a predetermined pitch. The pin-receiving holes 3a and 3b are generally circular in shape, and are provided with arcuate inward projections 4a and 4b which are formed opposingly at the front and rear ends of the holes 3a and 3b, respectively. The link plates of the adjacent groups 2 are alternately intermeshed such that the preceding group is shifted from the succeeding group by one pitch, namely, such that the rear pin-receiving holes 3b of the link plates of the preceding group are laterally aligned with the front pin-receiving holes 3a of the link plates of the succeeding group.

The adjacent link plate groups 2 which are arranged in this manner are connected by a pair of rocker pins 5a and 5b which are formed by arcuately bending an elongated strip along the shorter side thereof. The rocker pins 5a and 5b are identical in shape, and formed such that the small arcs on their inner peripheries have the same radius of curvature as the arcuate projections 4a and 4b. As shown particularly in FIG. 3, the rocker pins 5a and 5b are abutted against the arcuate projections 4a and 4b. In this instance, the paired rocker pins are so dimensioned that the large arcs on their outer peripheries of the rockers pins 5a and 5b which are inserted in the pin receiving holes 3a and 3b are spaced from a center line X—X of the pin-receiving holes 3a and 3b by a distance G.

Figure 4:
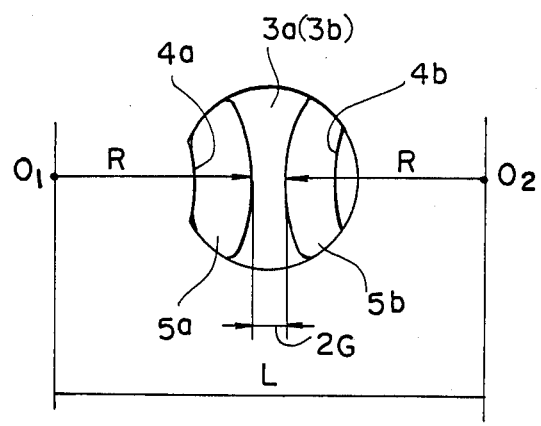
FIG. 4 is a schematic illustration showing the dimensional relationship between the gap space and the rocker pins.
Figure 5:
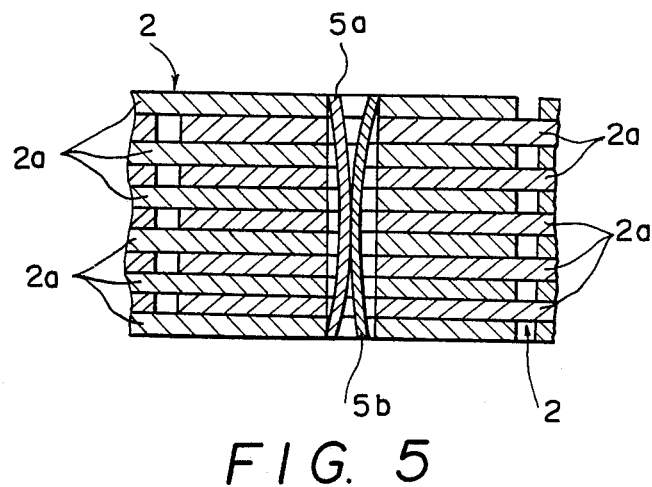
FIG. 5 is a schematic sectional view taken on line V—V of FIG. 1.

The just-mentioned spacing distance G is formed in the manner as shown in FIG. 4. Namely, the dimensional relationship is such that, when they are inserted in the laterally aligned pin-receiving holes 3a and 3b of the link plates 2a of the preceding and succeeding groups in abutting engagement with the arcuate projections 4a and 4b, the distance L between the centers $O_1$ and $O_2$ of the arcs of the rocker pins 5a and 5b is greater by 2G than two times the radius of R of the large arcs of the respective rocker pins 5a and 5b (which normally have the same radius of curvature). More specifically, the gap space G can be formed by one or a combination of the following methods: reducing the thickness of the rocker pins; enlarging the radius of the pin-receiving holes; and lowering the arcuate projections.

Accordingly, when the rocker pins 5a and 5b are inserted in the pin-receiving holes 3a and 3b, they are spaced from each other by a distance of 2G. In this instance, as the paired rocker pins 5a and 5b are fitted in the pin-receiving holes, longitudinal mid-portions of the pins are bent toward each other as shown particularly in FIG. 5, and retained in the pin-receiving holes by caulking the opposite ends of the rocker pins or by other suitable means. By so doing, the chain 1 can be assembled without loosening, maintaining the above-mentioned gap space G.

The chain 1 which has been assembled in this manner is passed around a drive sprocket 6 and a driven sprocket 7 with the tooth portions of the link plates 2a in meshing engagement with the sprockets 6 and 7. As the drive sprocket 6 is rotated by a motor or other rotational drive means, its rotation is transmitted to the driven sprocket 7 by the chain 1, putting the driven sprocket 7 in rotation. In this rotational drive operation, due to provision of the gap spaces 6, the interconnected link plate groups 2 are flexible beyond the normal limit positions of rolling movements of the rocker pins 5a and 5b, so that the link plate groups are permitted of flexion of a broader range as compared with the range of rolling movements of the rocker pins.

As a result, it becomes possible to minimize the rolling range of the rocker pins 5a and 5b as compared with the flexing range of the link plate groups 2. It follows that the large arc portions of the rocker pins 5a and 5b can be formed with a relatively large radius of curvature for enhancing the power transmission efficiency and lowering the Hertz stress. Besides, during rotation of the chain 1, flexing movements including inverse flexions are permitted between the link plate groups 2, thereby preventing imposition of unduly large loads on the rocker pins 5a and 5b and the link plates 2a, which would otherwise occur due to fluctuations in the transmitting torque. Thus, the silient chain can be operated smoothly without generating vibrations or noises, protecting the chain against damages.

The width of the gap spaces G which permit a broader range of flexing movements between the link plate groups is determined as follows. In a case where the large arcs of the rocker pins have a radius R, the total angle $\theta_1$ of forward flexion and the total angle $\theta_2$ of inverse flexion (the angles of flexion in the actual lapped direction and reverse direction are $\frac{1}{2}\theta_1$ and $\frac{1}{2}\theta_2$, respectively) are calculated on the basis of a minimum radius necessary for the inverse flexion and a radius of pitch circle of a minimum number of sprocket teeth necessary for the forward flexion, according to the following equations:

$$\theta_1 = 360°/2Z$$

(where Z is the number of teeth of the minimum sprocket); and $$\theta_2 = \sin^{-1}(P/2r)$$

(where P is the chain pitch and r is the minimum radius of the inverse flexion).

Using the value of either $\theta_1$ or $\theta_2$ whichever is larger, the width of the gap space G is calculated by $$(R+G)\cos\theta = R$$

$$G = \frac{R(1-\cos\theta)}{\cos\theta}$$

In this case, the forward flexion angle $\frac{1}{2}\theta_1$ and the inverse flexion angle $\frac{1}{2}\theta_2$ are substantially the same when the chain 1 is in a linear state.

Figure 6:
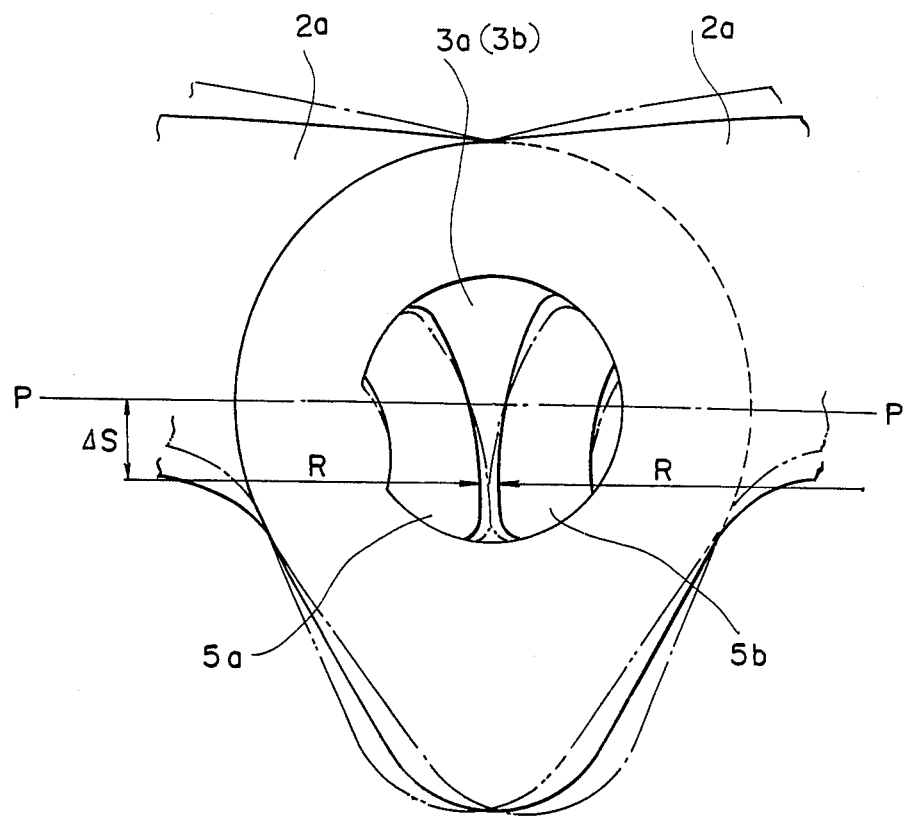
FIG. 6 is an enlarged outer view of a link plate and rocker pins which are different in shape from the pins shown in FIG. 1.

However, from a standpoint of the efficiency of power transmission, actually it is desirable to restrict the inverse flexion angle $\frac{1}{2}\theta_2$ to a range which is necessary for the inverse flexion of the chain which are caused by fluctuations in the transmitting torque. For this purpose, the center O of arcs of the rocker pins 5a and 5b are offset by $\Delta S$ in the inward direction from the pitch line P of the chain 1 in linear state, as shown in FIG. 6. By so doing, the link plate groups have a forward flexion angle $\frac{1}{2}\theta_1$ as shown in the same figure, which is greater than the inverse flexion angle $\frac{1}{2}\theta_2$. Accordingly, the forward flexion angle or the flexion angle toward the sprockets 6 and 7 and the inverse flexion angle of the chain can be predetermined independently of each other, while suppressing the total flexion angle $\theta'$ ($\theta' = \frac{1}{2}\theta_1 + \frac{1}{2}\theta_2$) to a minimum.

By the provision of the gap spaces G which are formed between the rocker pins 5a and 5b in this manner, it becomes possible to secure a greater flexing range between the link plate groups 2 as compared with the back-rolling range of the rocker pins 5a and 5b. Consequently, it is possible to enlarge the radius of curvature of large arcs of the rocker pins 5a and 5b to enhance the efficiency of power transmission, permitting the inverse flexion while suppressing the Hertz stress.

Figure 7:
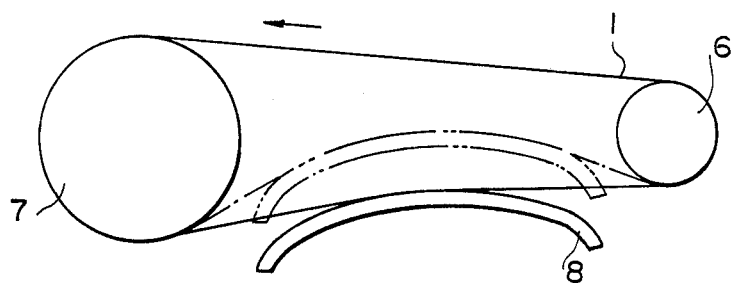
FIG. 7 is a schematic illustration showing the general arrangement of a silient chain with a tensioner.

As described hereinbefore, a desired inverse flexion angle can be obtained by providing the gap space G between the rocker pins 5a and 5b and by suitably determining the offset positions of the arc centers from the pitch line. Accordingly, when the chain is employed as a high-speed silent chain, a tensioner 8 of a desired shape can be located in a desired position to take up slacks in the lower run of the chain 1 which is passed around sprockets 6 and 7 as shown in FIG. 7. Should elongation occur to the chain 1 after use over a long time period, the tensioner 8 may be shifted to the position indicated in phantom in the same figure to maintain the chain in properly tensioned state.

By the inverse flexion, the chain 1 can be bent to a certain extent, so that a rotationally driven unit like an oil pump or hydraulic pump can be operated on the back side of the chain 1 as shown in FIG. 8.

Now referring to FIGS. 9 through 17, there is shown a second embodiment of the invention, using the chain as a power transmission chain belt.

Figure 9:
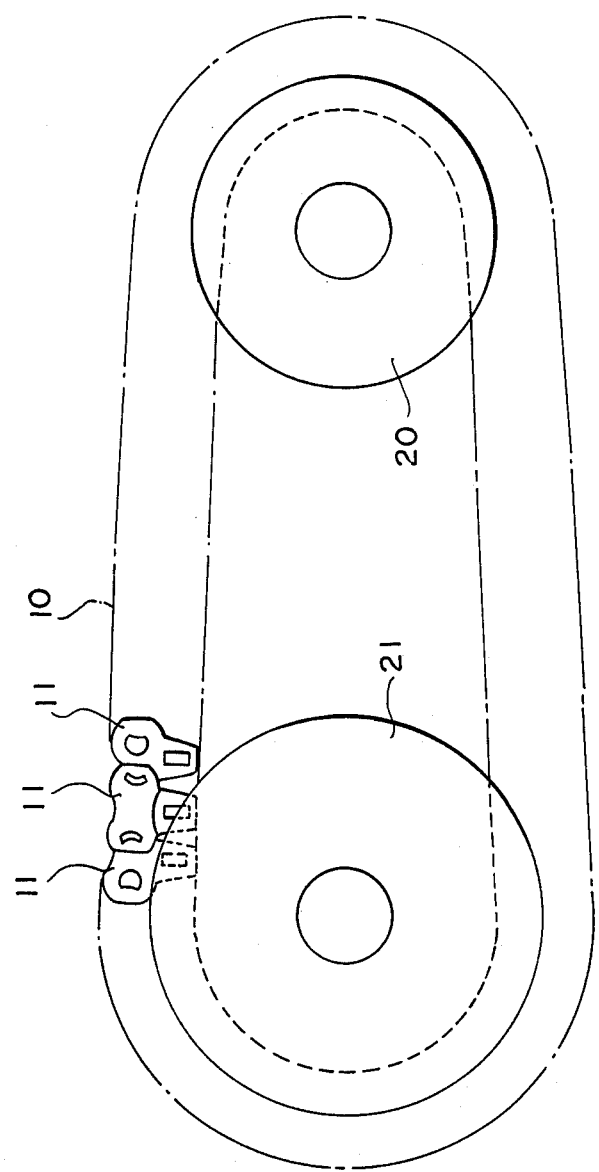
FIG. 9 is a schematic illustration showing the general arrangement of the chain of the invention as applied as a chain belt for power transmission.

In FIG. 9, denoted at 10 is a chain belt consisting of endlessly connected link plate groups which in turn consist of a combination of main link plates 11a as shown in FIG. 10(a), sublink plates 11b as shown in FIG. 10(b) and pin link plates 11c as shown in FIG. 10(c), assembled together with rocker pins 12a and 12b as shown in FIG. 11(a) and V-blocks 13 as shown in FIG. 11(b). The rocker pins 12a and 12b are constituted by curved strips of a shape substantially same as in FIG. 1.

The main link plate 11a consists of a plate with a gourd-shaped portion and a central lower extension. The gourd-shaped portion is provided with a pair of front and rear pin-receiving holes 14a and 14b, while the lower extension is provided with a block-receiving hole 15 in an intermediate position between the two pin-receiving holes 14a and 14b. On the other hand, the sublink plate 11b consists of a ground-shaped portion alone, which is provided with pin-receiving holes 16a and 16b in positions corresponding to the pin-receiving holes 14a and 14b of the main link plate 11a. These pin-receiving holes 14a, 14b, 16a and 16b are generally circular in shape and provided with arcuate projections 17a and 17b or 18a and 18b oppositely at the front and rear ends thereof. Further, the pin link plate 11c consists of a gourd-shaped plate which is provided with arcuate pin-receiving holes 19a and 19b for inserting one of the paired rocker pins.

Figure 13:
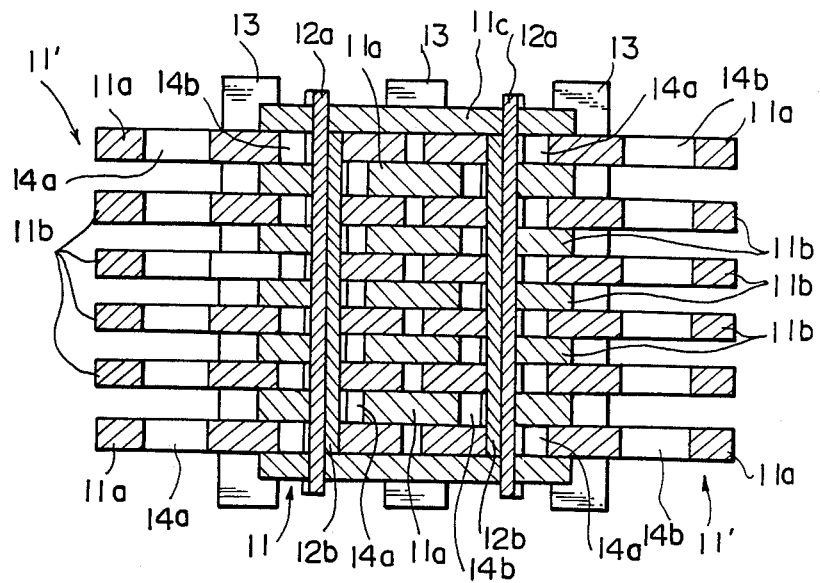
FIG. 13 is a schematic sectional view taken on line XIII—XIII of FIG. 12.
Figure 14:
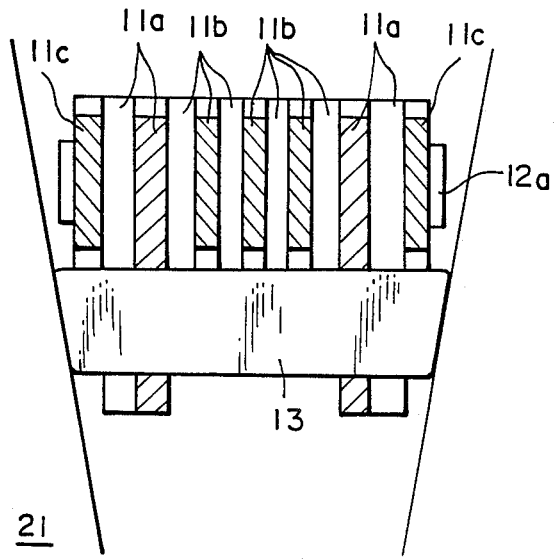
FIG. 14 is a schematic sectional view taken on line XIV—XIV of FIG. 12, showing the chain belt as lapped around a pulley.
Figure 15:
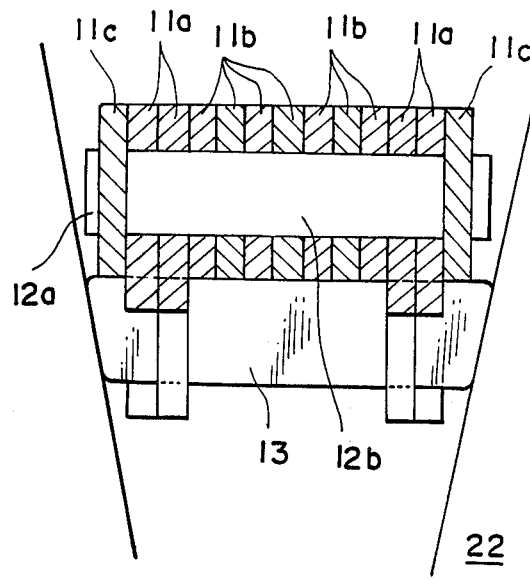
FIG. 15 is a schematic sectional view taken on line XV—XV of FIG. 12, showing the chain belt as lapped around a pulley.
Figure 16:
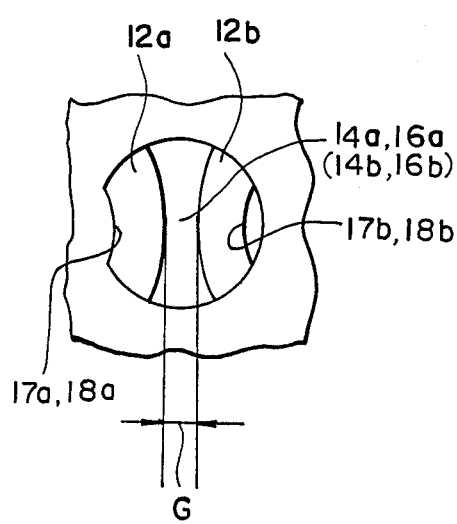
FIG. 16 is a schematic illustration showing the condition of rocker pins in pin-receiving hole which is in aligned position.
Figure 17:
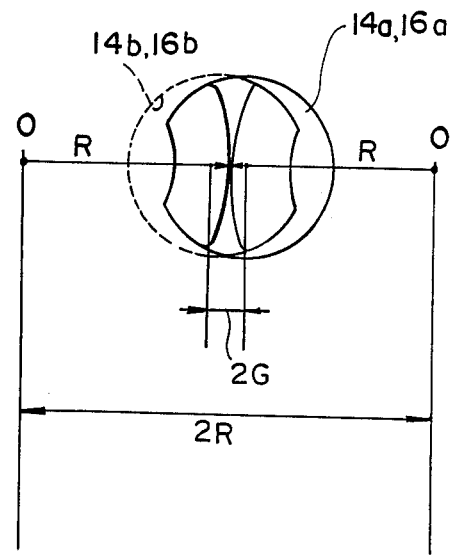
FIG. 17 is a schematic illustration showing the relationship between the gap space and the rocker pins.

As illustrated in FIGS. 12 and 13, the chain is formed by successively connecting, for example, a first link plate group 11 which has three centrally located sublink plates 11b, a couple of main link plates 11a located on the outer sides of the sublink plates 11b and a couple of pin link plates 11c located on the outer sides of the main link plates 11a, and a second link plate group 11' which has only a pair of main link plates 11a on the outer sides of four centrally located sublink plates 11b, alternately connecting the first and second link plate groups 11 and 11' in intermeshed state with a shift of one pitch from each other. The adjacent link plate groups 11 and 11' which are arranged in the this manner are connected by a couple of rocker pins 12a and 12b which are inserted into the main plates 11a and sublink plates 11b in back-to-back relation. One of the rocker pins 12a and 12b is fixed in the pin-receiving holes 19a and 19b of the pin link plates 11c by fitting with an interference and caulking or other suitable means. Further, a V-block is fitted in the block receiving openings 15 in the main plates 11a. As shown in FIGS. 14 and 15, when the chain 1 is passed around the pulleys 20 and 21 which constitute rotational driving and driven member, the V-blocks 13 are abutted against the conical walls of these pulleys 20 and 21.

The paired rocker pins 12a and 12b have such a radius of curvature that a gap space G is formed therebetween when inserted in laterally aligned pin-receiving holes 14a, 14b, 16a and 16b of the main link plates 11a and sublink plates 11b of adjacent link plate groups. Besides, the distance D between the paired pin-receiving holes in each link plate is smaller by 2G than the distance d which is formed between the adjacent V-blocks 13 of the assembled chain belt 10. As a result, as clear from FIG. 17, when the chain belt 10 is assembled, the center of the pin-receiving holes of a link plate group 11 and the center of the pin receiving holes of a link plate group 11', which receive a pair of rocker pins 12a and 12b, are spaced from each other by a distance 2G on the pitch line. This spacing distance 2G can be provided by adopting an arrangement as described hereinbefore in connection with FIG. 4.

With the above-described chain construction, the rocker pin 12a which abuts against the projections 17a and 18a of one of the adjacent link plate groups 11 and 11', more specifically, of the link plate group 11, is spaced from the inner walls of the pin-receiving holes 14b and 16b of the other link plate group 11', while the rocker pin 12b which abuts against the projections 17b and 18b of the link plate group 11' is spaced from the inner walls of the pin-receiving holes 14a and 16a of the link plate group 11. Therefore, the link plate groups 11 and 11' can be flexed relative to each other, beyond the limit positions of rolling movements of the rocker pins 12a and 12b, until the inner walls of the respective pin-receiving holes are abutted against a rocker pin, permitting the link plate groups 11 and 11' to flex over a broader range according to the above-described spacing distance of the pin-receiving holes. Accordingly, it becomes possible to permit inverse flexion of the chain for protecting its component parts and at the same time for ensuring smooth operation with less vibrations, while maintaining satisfactory power transmission efficiency by the use of rocker pins 12a and 12b having a large radius of curvature.

The chain belt of this embodiment is also convenient for locating a tensioner as in FIG. 7, and, needless to say, it can be connected with an additional rotational unit as shown in FIG. 8. The angle of flexion in the lapping direction and the angle of inverse flexion can be suitably determined by way of the offset distance between the pin-receiving holes and the offset distance of the abutting positions of the rocker pins 12a and 12b from the pitch line.

Further, as the power transmission between the chain 10 and V-pulleys 20 and 21 is effected through the V-blocks 13 which contact the pulleys 20 and 21, slips between the contacting parts should be reduced to a minimum. In this connection, since the link plate groups 11 and 11' can be flexed in the inverse direction, a chain belt which is slackened in a suitable degree is taken into a V-pulley on its unloaded side free of the driving force, increasing its angle of contact with the V-pulley. As a result, the contact areas of the V-blocks with the V-pulley are increased, suppressing slips therebetween and enhancing the power transmission efficiency further more.

Figure 18:
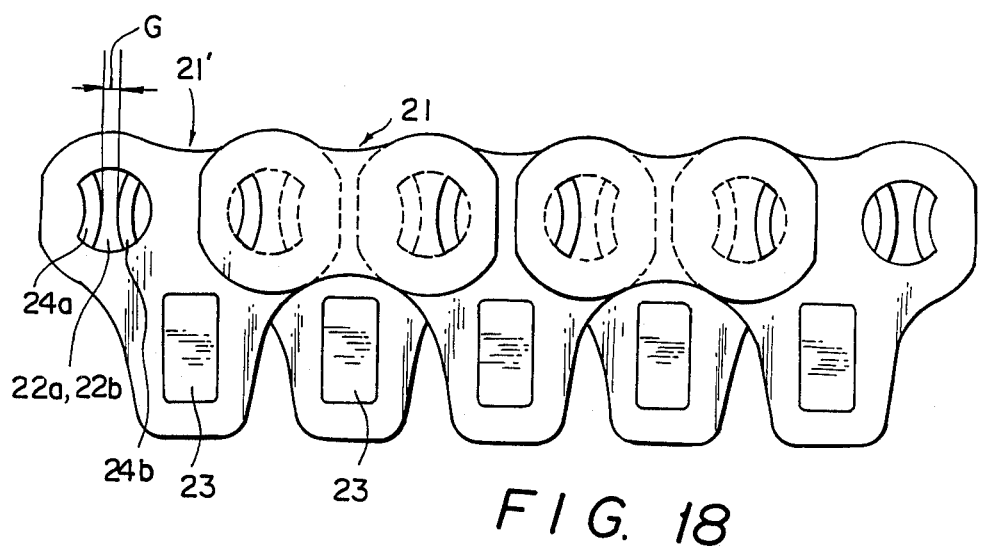
FIG. 18 is a fragmentary outer view of a chain belt which is constructed in a manner similar to the first embodiment.

As shown particularly in FIG. 18, even when the pin-receiving holes 22a and 22b of the link plate groups 21 and 21' of the chain are provided at the same pitch as the V-blocks 23, the range of flexing movements between the link plate groups 21 and 21' can be broadened as compared with the range of rocking movements of the rocker pins 24a and 24b if the paired rocker pins 24a and 24b which are inserted in the pin-receiving holes 22a and 22b in back-to-back relation are spaced from each other by a gap space G.

Figure 19:
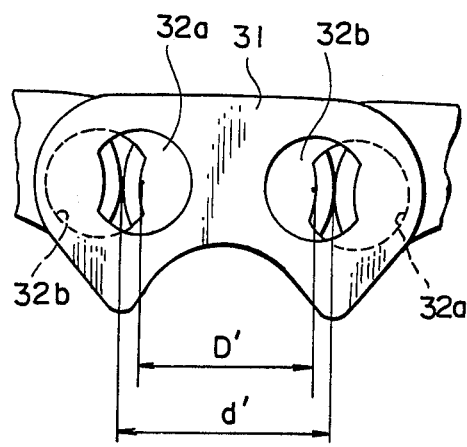
FIG. 19 is a fragmentary outer view of a silent chain which is constructed in a manner similar to the second embodiment.

On the other hand, even in case of the silient chain of the first embodiment shown in FIG. 1, the pitch D' of the paired pin-receiving holes 32a and 32b which are formed in the link plates 31 may be narrowed as compared with the distance d' between the center lines of tooth portions in the opposite end portions of the link plates 31 as shown in FIG. 19 to obtain the effects similar to the second embodiment.

What is claimed is:

1. A chain to be lapped around a rotational drive member and a driven member for power transmission, said chain consisting of endlessly connected link plate groups each containing a plural number of link plates with a pair of pin-receiving holes and successively connected with adjacent link plate groups, with the respective link plates intermeshed alternately with the link plates of adjacent groups and with a shift of one pitch from the latter, by means of paired rocker pins inserted in said pin-receiving holes in back-to-back relation with each other, wherein:
    said paired rocker pins inserted in the pin-receiving holes in the intermeshed link plates are formed in an arcuate shape and spaced from each other by a predetermined distance when the centers of said pin-receiving holes are aligned with each other for permitting inverse flexing movement of said link plate groups.

2. The power transmission chain of claim 1, wherein said chain is assembled such that the pin-receiving holes in said intermeshed link plates are aligned with each other when said chain is lapped around a rotational drive member and a driven member.

3. A chain to be lapped around a rotational drive member and a driven member for power transmission, comprising:
    endlessly connected link plate groups each containing a plural number of link plates with a pair of pin receiving holes and successively connected with adjacent link plate groups with the respective link plates intermeshed alternately with the link plates of adjacent groups and with a shift of one pitch from the latter;
    paired rocker pins formed in arcuate shapes inserted in said pin-receiving holes in back-to-back relation with each other to be spaced from each other by a predetermined distance when the centers of said pin-receiving holes are aligned with each other for permitting inverse flexing movement of the adjacent link plate groups;
    V-blocks fitted to said link plates at the same pitch as said pin-receiving holes between adjacent pairs of said rocker pins.

4. The power transmission chain of claim 2, wherein said link plates are formed with tooth portions in front and rear end portions thereof, and said paired pin-receiving holes of said link plates are formed at a pitch coinciding with the distance between center lines of said tooth portions.

5. The power transmission chain of claim 2, wherein said paired rocker pins inserted in said pin-receiving holes of said link plates are warped such that longitudinally mid-portions of said rocker pins engage one another and ends of said rocker pins are spaced in a direction away from each other by said predetermined distance.

6. The power transmission chain of claim 1, wherein the centers of the pin-receiving holes of said intermeshed link plates are offset by a predetermined distance in the direction of the pitch line when said chain is lapped around said drive and driven members.

7. The power transmission chain of claim 6, wherein said link plates are fitted with V-blocks, and provided with said pin-receiving holes at a smaller pitch than that of said V-blocks.

8. The power transmission chain of claim 6, wherein said link plates are provided with a pair of tooth portions in front and rear portions, and provided with said paired pin-receiving holes at a smaller pitch than the distance between the center lines of said tooth portions.

9. The power transmission chain of one of claims 1, 2, 4 to 8 and 3, wherein the centers of arcs of said rocker pins are located in a position offset from the pitch line of said chain.

10. The power transmission chain of claim 9, wherein the centers of arcs of said rocker pins are offset in a direction on the inner side of said pitch line.

11. The power transmission chain of one of claims 3 and 7, wherein said chain is slackened in a predetermined degree to permit an increase in the angles of contact with said drive and driven members.

12. The power transmission chain of one of claims 1, 2, 4 to 8 and 3, wherein said chain is further associated with a rotationally driven member located on the return side of said chain.

* * * * *